(12) United States Patent
Kim et al.

(10) Patent No.: US 7,889,152 B2
(45) Date of Patent: Feb. 15, 2011

(54) DIRECT VIEWING TYPE STEREOSCOPIC IMAGE DISPLAY APPARATUS WHICH CAN REMOVE MOIRE PATTERN

(75) Inventors: Tae-hee Kim, Suwon-si (KR); Kun-ho Cho, Suwon-si (KR); Sung-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 946 days.

(21) Appl. No.: 11/328,074

(22) Filed: Jan. 10, 2006

(65) Prior Publication Data

US 2006/0170834 A1  Aug. 3, 2006

(30) Foreign Application Priority Data

Feb. 3, 2005  (KR) .................. 10-2005-0010248

(51) Int. Cl.
*G09G 5/00* (2006.01)
*H04N 13/00* (2006.01)

(52) U.S. Cl. .................. 345/7; 348/42; 348/115; 359/376; 359/462; 349/11; 349/15

(58) Field of Classification Search .......... 345/7–9; 348/42–60, 115, 11; 349/11, 15; 359/376–378, 359/462–477

See application file for complete search history.

(56) References Cited

U.S. PATENT DOCUMENTS

| | | | | |
|---|---|---|---|---|
| 5,317,409 | A | | 5/1994 | Macocs |
| 5,719,620 | A | * | 2/1998 | Allio .......................... 348/49 |
| 5,825,541 | A | | 10/1998 | Imai |
| 5,907,434 | A | * | 5/1999 | Sekine et al. ............... 359/462 |
| 6,049,424 | A | | 4/2000 | Hamagishi |
| 6,144,404 | A | | 11/2000 | Alejo Trevijano |
| 6,204,967 | B1 | | 3/2001 | Morishima et al. |
| 6,940,473 | B2 | * | 9/2005 | Suyama et al. ............... 345/6 |
| 7,417,601 | B2 | * | 8/2008 | Brown Elliott ............... 345/7 |
| 2002/0118452 | A1 | * | 8/2002 | Taniguchi et al. ........... 359/463 |

FOREIGN PATENT DOCUMENTS

| | | |
|---|---|---|
| EP | 1 001 299 A1 | 5/2000 |
| EP | 0 935 154 A3 | 12/2000 |
| JP | 2002-072355 A | 3/2002 |

(Continued)

*Primary Examiner*—Alexander Eisen
*Assistant Examiner*—Cory A Almeida
(74) *Attorney, Agent, or Firm*—Sughrue Mion, PLLC

(57) ABSTRACT

A direct viewing type stereoscopic image display apparatus which can remove a moiré pattern is provided. The direct viewing type stereoscopic image display apparatus includes: a first memory which has a first field image signal divided from an image signal of one frame; a second memory which has a second field image signal divided from the image signal of one frame; a display device which forms a first field image and a second field image according to the first field image signal and the second field image signal; an image shift unit which sequentially shifts the first field image and the second field image; and a viewing zone dividing unit which divides the viewing zones of the first field image and the second field image. Thereby, the second field image is shifted from the first field image by a predetermined distance and thus a moiré pattern is removed and image quality is improved.

12 Claims, 4 Drawing Sheets

FOREIGN PATENT DOCUMENTS

| | | |
|---|---|---|
| JP | 2004-069741 A | 3/2004 |
| JP | 2004-354899 A | 12/2004 |
| KR | 10-2002-0041382 A | 6/2002 |
| KR | 10-2002-0095364 A | 12/2002 |
| KR | 10-2003-0030365 A | 4/2003 |
| KR | 10-2003-0030366 A | 4/2003 |
| KR | 10-2003-0077357 A | 10/2003 |
| KR | 10-2004-0022403 A | 3/2004 |
| WO | 2004/088996 A1 | 10/2004 |

\* cited by examiner

LEFT EYE IMAGE  RIGHT EYE IMAGE

DIRECT VIEWING TYPE STEREOSCOPIC IMAGE DISPLAY APPARATUS WHICH CAN REMOVE MOIRE PATTERN

CROSS-REFERENCE TO RELATED PATENT APPLICATION

This application claims the benefit of Korean Patent Application No. 10-2005-0010248, filed on Feb. 3, 2005, in the Korean Intellectual Property Office, the disclosure of which is incorporated herein in its entirety by reference.

BACKGROUND OF THE INVENTION

1. Field of the Invention

The present invention relates to a direct viewing type stereoscopic image display apparatus which can remove a moiré pattern to improve image quality.

2. Description of the Related Art

Generally, a three dimensional image is obtained by the principle of stereoscopic visual angle through two eyes of a person. Binocular parallax, which appears by two eyes spaced about 65 mm apart, is considered to be an important factor in the stereoscopic effect. A three dimensional image display apparatus includes a stereoscopic display apparatus using glasses and an auto-stereoscopic display apparatus. The auto-stereoscopic display apparatus obtains the three dimensional image by dividing the image into left and right images without using glasses. The auto-stereoscopic method includes a parallax barrier method and a lenticular method.

The parallax barrier method is a method for alternately printing images viewed by the left and right eyes in a longitudinal pattern shape and viewing the images using very thin longitudinal lines, that is, barriers. Thereby, the image is divided into the longitudinal pattern image which will enter the left eye and the longitudinal pattern image which will enter the right eye by the barriers, such that the images having different view points enter the left eye and the right eye, to form the three dimensional image.

FIG. 1A shows a conventional direct viewing type three dimensional image display apparatus. The display device 15 receives an image signal from the image signaling unit 10 and forms an image. The image is divided into a right eye RE image and a left eye LE image by the parallax barrier 17 to form the three dimensional image.

As shown in FIG. 1A, the parallax barrier 17 has alternating slits 17a and barriers 17b. The image is divided into the left eye image and the right eye image by the slits 17a to form the three dimensional image.

However, according to this method, since the image is formed by the slits 17a and the image is blocked by the barriers 17b, the left eye image L is formed only in even lines by the slit 17a, and black lines K are formed in the odd lines by the barrier 17b. Also, the right eye image R is formed only in odd lines by the slits 17a, and black lines K are formed in the even lines by the barrier 17b. Accordingly, there are problems in that the resolution and brightness of the display are low.

Also, a moiré pattern is generated by interference between a periodic pattern of the parallax barrier 17 and the image formed by the display device 15.

The moiré pattern appears due to interference that occurs when periodic spatial patterns overlap. FIG. 2 shows the generation of the moiré pattern. There is a problem that the image quality is reduced by the moiré pattern.

SUMMARY OF THE INVENTION

The present invention provides a direct viewing type stereoscopic image display apparatus which can remove a moiré pattern to improve image quality without reducing the resolution or increasing the pixel count.

According to an aspect of the present invention, there is provided a direct viewing type stereoscopic image display apparatus including: a first memory which has a first field image signal divided from an image signal of one frame; a second memory which has a second field image signal divided from the image signal of one frame; a display device which forms a first field image and a second field image according to the first field image signal and the second field image signal; an image shift unit which time-sequentially shifts the first field image and the second field image; and a viewing zone dividing unit which divides the viewing zones of the first field image and the second field image, wherein a moiré pattern is removed by the first field image and the second field image.

The display device may have a fill factor of 0.5.

The image shift unit may have a polarization converting unit which is positioned between the display device and the viewing zone dividing unit and selectively converts the polarization direction of incident light, and a birefringence element which directly transmits or refracts the light by changing a refractive index according to the polarization direction of the light passing through the polarization converting switch.

The polarization converting switch may be a liquid crystal polarization converter.

The polarization converting switch may be turned on and off in synchronization with the first and second field image signal.

The birefringence element may be composed of calcite or liquid crystal.

The birefringence element may have a triangular shape and be adhered to a prism.

The birefringence element and the prism may be arranged in an array shape.

The viewing zone dividing unit may comprise a lenticular lens, a fly's eye lens or a parallax barrier.

The viewing zone dividing unit may have a liquid crystal barrier so as to selectively switch between a two dimensional image and a three dimensional image.

The display device may be a liquid crystal display (LCD) device or a ferro liquid crystal display (FLCD) device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
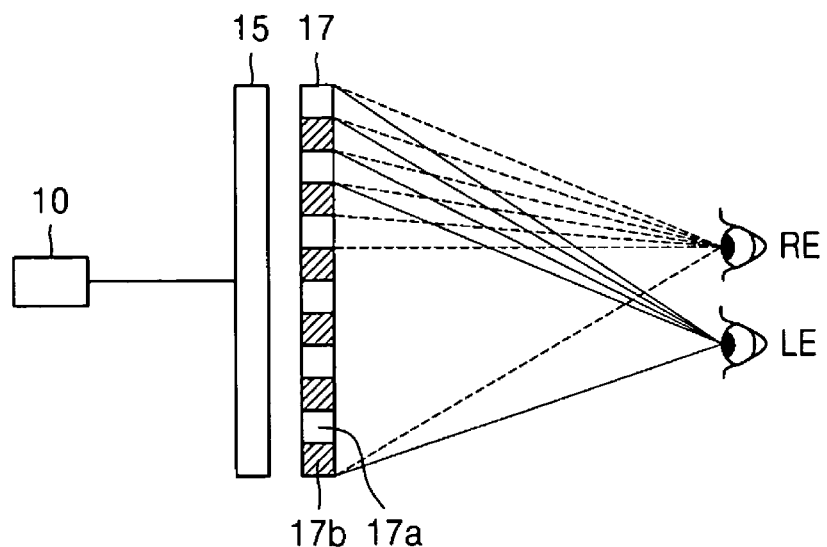
FIG. 1A schematically shows a conventional direct viewing type stereoscopic image display apparatus.
Figure 1B:
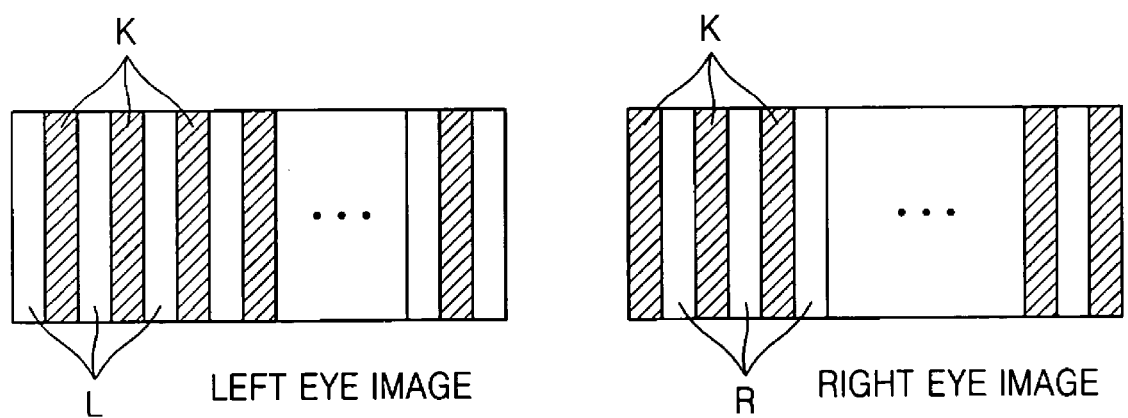
FIG. 1B shows a left eye image and a right eye image formed by the stereoscopic image display apparatus shown in FIG. 1A.
Figure 2:
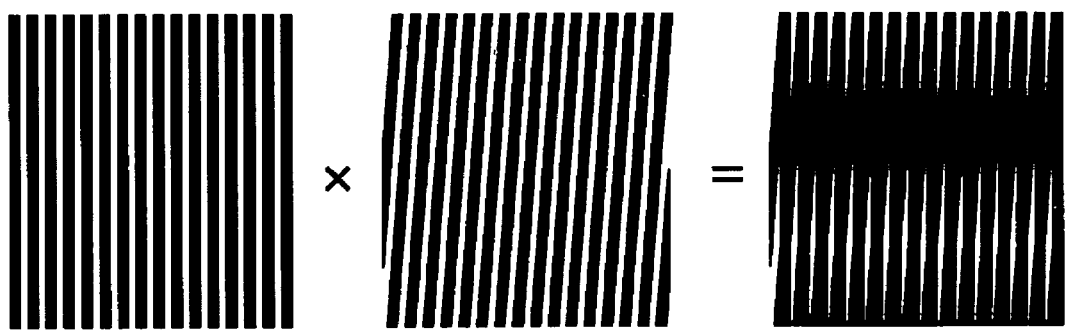
FIG. 2 shows a moiré pattern formed in the conventional direct viewing type stereoscopic image display apparatus.
Figure 3:
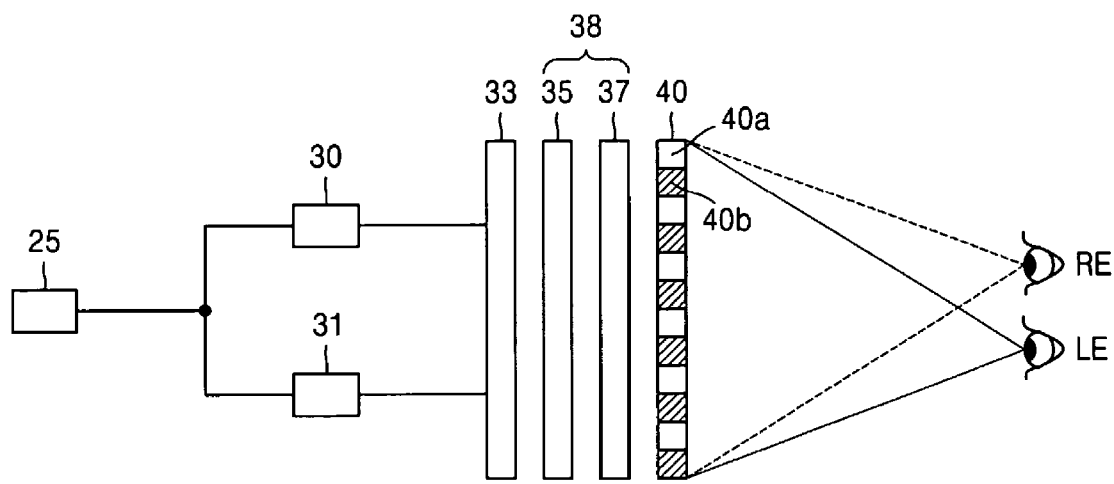
FIG. 3 schematically shows a direct viewing type stereoscopic image display apparatus which can remove the moiré pattern according to an exemplary embodiment of the present invention.

Referring to FIG. 3, according to the direct viewing type stereoscopic image display apparatus of the present invention, a signal from an image signaling unit 25 is divided into a first field image signal and a second field image signal by a signal divider, a first field image according to the first field image signal and a second field image according to the second field image signal are divided into viewing zones for a right eye image and a left eye image, and thus the three dimensional image is realized.

The first field image signal is stored in a first memory 30 and the second field image signal is stored in a second memory 31. The first and second memories 30 and 31 are connected to a display device 33 for forming an image. The display device 33 is connected to an image shift unit 38 for shifting the image formed by the display device 33 by a predetermined distance. The image shift unit 38 is connected to a viewing zone dividing unit 40 for dividing the viewing zones of the first field image and the second field image and transmitting them to the right eye RE and the left eye LE to form the stereoscopic image.

The display device 33 is a liquid crystal display (LCD) device or a ferro liquid crystal display device (FLCD) which is dependent on polarization, and is preferably, but not necessarily, a transmission type display device.

Figure 4A:
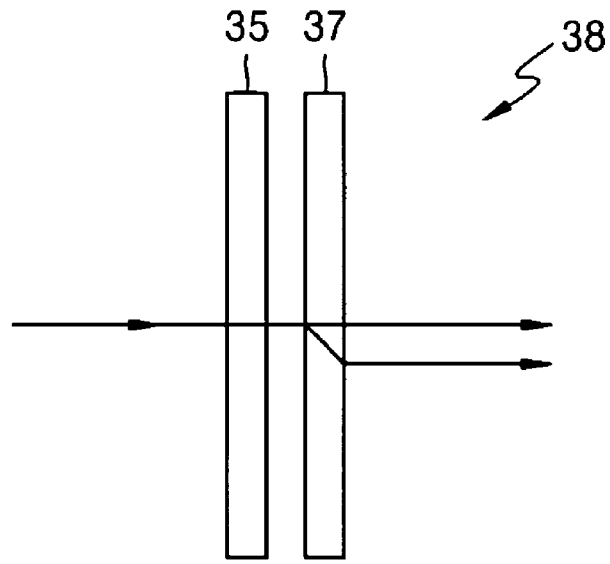
FIG. 4A is an example of an image shift unit included in the direct viewing type stereoscopic image display apparatus.

As shown in FIG. 4A, the image shift unit 38 has a polarization converting switch 35 for sequentially converting the polarization direction of incident light, and a birefringence element 37 for transmitting or refracting incident light depending on its polarization direction. The polarization converting switch 35 is, for example, a liquid crystal polarization converter, and can selectively apply a power supply voltage to each pixel to convert the polarization direction of the incident light.

The birefringence element 37 has a property that its refractive index varies according to the polarization direction of the incident light. That is, a normal light beam having the polarization direction parallel to the crystal optical axis of the birefringence element is transmitted through the birefringence element by the normal refractive index of the birefringence element, and an abnormal light beam having a polarization direction perpendicular to the crystal optical axis of the birefringence element is refracted by the abnormal refractive index of the birefringence element. Accordingly, P-polarization light and S-polarization light are refracted at different angles when passing through the birefringence element 37. The birefringence element 37 is, for example, composed of calcite or liquid crystal.

Figure 4B:
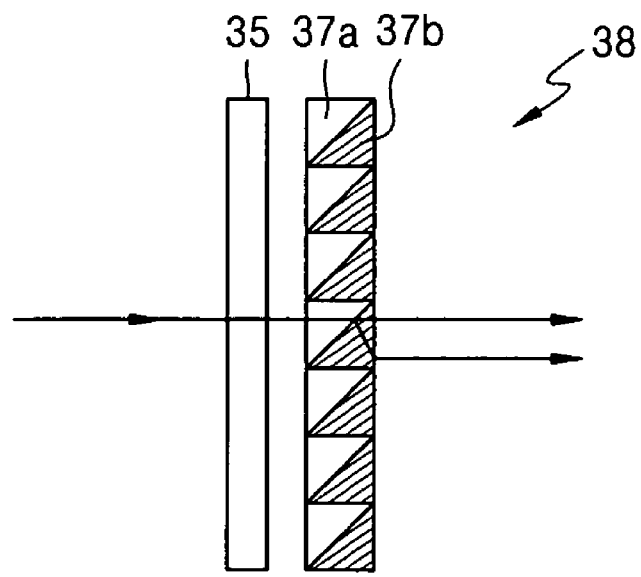
FIG. 4B is another example of an image shift unit included in the direct viewing type stereoscopic image display apparatus.

As shown in FIG. 4B, the birefringence element 37b has a triangular shape, and a prism 37a having a triangular shape may be adhered to the birefringence element 37b. The prism 37a and the birefringence element 37b are included in plural and are arranged in an array. Also, the birefringence element 37 may be composed of one prism and one birefringence element. The prism 37a has the same refractive index as the birefringence element 37b. A normal light beam, for example, P-polarization light, passes through the boundary of the prism 37a and the birefringence element 37b without refraction, and an abnormal light beam, for example, S-polarization light, is refracted at the boundary of the prism 37a and the birefringence element 37b.

Referring to FIG. 4A, the first field image signal is input to the display device 33 to form the first field image F1. If the first field image F1 has a first polarization direction, for example, S-polarization, the polarization converting switch 35 is turned off and the first field image of the first polarization direction is incident to the birefringence element 37 and transmitted straight through. Next, the second image signal is input to the display device 33 to form the second field image F2. When the polarization converting switch 35 is turned on, the first polarization direction is converted into the second polarization direction, for example, the P-polarization direction, and thus the second field image F2 of the second polarization direction is incident to the birefringence element 37. The second field image of the second polarization direction is refracted by the birefringence element 37.

The first field image F1 is transmitted straight through the birefringence element 37, and the second field image F2 is refracted by the birefringence element 37 to be shifted from the first field image F1. At this time, the shift distance d can be adjusted by changing the thickness of the birefringence element 37. The shift distance d is preferably ½ of the pixel pitch. The first field image F1 and the second field image F2 are divided into the left eye image and the right eye image by the viewing zone dividing unit 40 to form the stereoscopic image. The viewing zone dividing unit 40 may be composed of a lenticular lens, a fly's eye lens or a parallax barrier. The lenticular lens focuses incident light having different incident angles to different points to divide the image into the left eye image and the right eye image. The parallax barrier has alternating slits and barriers to focus incident light having different incident angles to different points to divide the image into the left eye image and the right eye image.

The lenticular lens, the parallax barrier or the fly's eye lens divides the image into the left eye image and the right eye image and focuses them to the left eye and the right eye to form the three dimensional image. This image dividing unit accomplishes only the three dimensional mode and can not operate in a two dimensional mode.

On the other hand, the viewing zone dividing unit 40 may be a liquid crystal barrier which can switch between the two dimensional mode and the three dimensional mode. The liquid crystal barrier can selectively form the slit 40a and the barrier 40b by switching electrodes coupled to the liquid crystal. By turning off all the electrodes of the liquid crystal barrier to make the whole liquid crystal barrier into a slit, the image can be transmitted without being divided into the left eye image and the right eye image. Thereby, the same image is formed on the left eye and the right eye, to realize a two dimensional image. Also, by controlling the electrodes of the liquid crystal barrier for each pixel, alternating slits 40a and barriers 40b can be formed such that the image is divided into the right eye image and the left eye image and a three dimensional image is realized.

Next, the operation for obtaining the image without the moiré pattern according to the present invention will be described.

The image signaling unit 25 inputs the first field image signal to the first memory 30 and inputs the second field image signal to the second memory 31. First, the first field image signal is input to the display device 33 to form the first field image. In the present embodiment, it is preferable, but not necessary, that the fill factor of the display device 33 is 0.5. The fill factor represents the ratio of efficient pixel size to the whole pixel size. The efficient pixel size represents the size which is actually used for forming the image. The brightness of image input to the display device 33 may be reduced, but the resolution is not reduced, because the same signal is input no matter whether the fill factor is 1.0 or 0.5. The brightness is maintained by increasing the light source. In the present invention, the resolution is prevented from being reduced by adjusting the fill factor of the display device 33.

The first field image of the first polarization direction, for example, the P-polarization direction, passes through the polarization converting switch 35 and is then transmitted straight through the birefringence element 37, when the polarization converting switch 35 is turned off.

Subsequently, when the second field image formed at the display device 33 is incident to the polarization converting switch 35 according to the second field image signal, the polarization converting switch 35 is turned on and thus the polarization direction of the second field image is converted. The second field image converted into the second polarization direction, for example, the S-polarization direction, is refracted by the birefringence element 37 and shifted from the first field image by a predetermined distance. The shift distance of the second field image is preferably ½ of the pixel pitch of the display device 33.

Figure 5A:
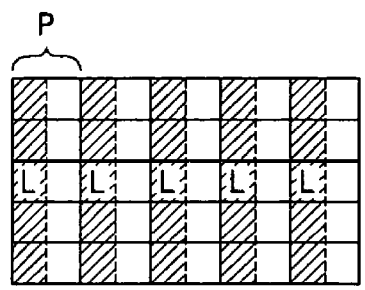
FIGS. 5A and 5B are an example of forming the left eye image and the right eye image in a display device included in the direct viewing type stereoscopic image display apparatus according to the present invention.
Figure 5B:
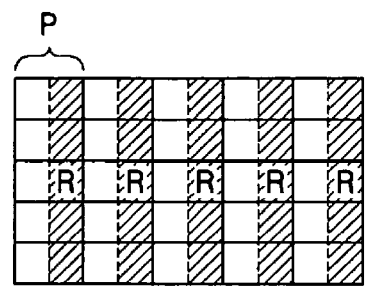

As shown in FIGS. 5A and B, the first field image is formed on the left half pixel L of the pixel P (FIG. 5A) by the polarization converting switch 35 and the birefringence element 37, and the second field image is moved by the half pixel and formed on the right half pixel R of the pixel by the polarization converting switch 35 and the birefringence element 37 (FIG. 5B).

Figure 6A:
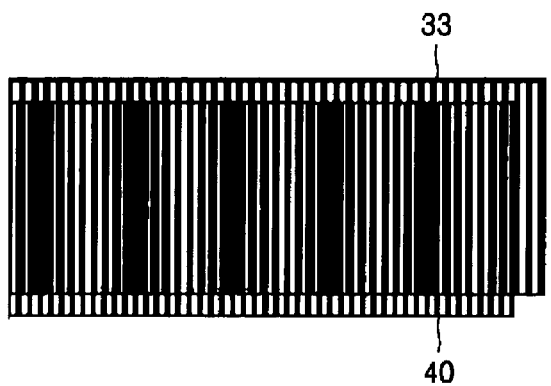
FIGS. 6A and 6B illustrates the principle of removing the moiré pattern according to the present invention.
Figure 6B:
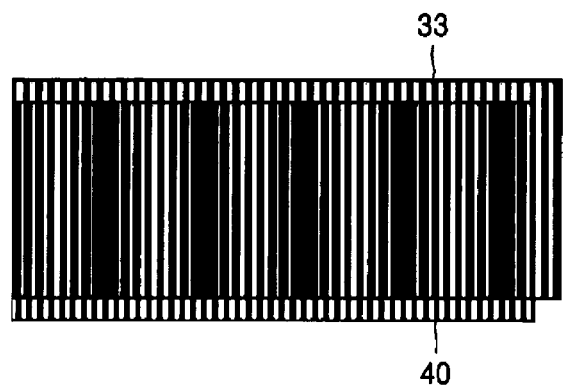

As shown in FIG. 6A, a first moiré pattern is formed by the first field image and the periodic barrier pattern of the viewing zone dividing unit 40, and, as shown in FIG. 6B, a second moiré pattern is formed by the shifted second field image and the periodic barrier pattern of the viewing zone dividing unit 40. Since the second field image is shifted from the first field image by the half pixel and the periodic barrier pattern of the viewing zone dividing unit 40 is the same for the first field image and the second field image, the phase of the second moiré pattern is opposite to that of the first field image. Accordingly, the first moiré pattern and the second moiré pattern cancel each other out, and thus an image with no moiré pattern can be obtained.

For example, when the period of one frame is 1/30 second, the first field image is displayed for 1/60 second and the second field image is displayed for 1/60 second. The polarization converting switch 35 is switched in synchronization with the second field image signal to convert the polarization direction of the second field image.

In the present invention, by setting the fill factor to 0.5 and shifting the pixel pitch by ½ during the period of one frame to display two fields, a two dimensional image and a three dimensional image can be realized without lowering the resolution, and a high quality image without moiré patterns can be obtained.

According to the direct viewing stereoscopic image display apparatus of the present invention, one frame image is divided into the first field image and the second field image, and the second field image is shifted from the first field image by a predetermined distance. Accordingly, the moiré pattern can be removed and the image quality can be improved. Also, by setting the fill factor of the display device to 0.5 and allowing the fill factor of the first field image and the second field image to become 1, two dimensional images and three dimensional images can be displayed without increasing the pixel count of the display device or reducing the resolution.

Also, since the liquid crystal barrier is used as the viewing zone dividing unit to select the two dimensional image or the three dimensional image, the convenience of the viewer is enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A direct viewing type stereoscopic image display apparatus comprising:
    a first memory which has a first field image signal divided from an image signal of one frame;
    a second memory which has a second field image signal divided from the image signal of one frame;
    a display device which forms a first field image having a first right eye image and a first left eye image according to the first field image signal and a second field image having a second right eye image and a second left eye image according to the second field image signal;
    an image shift unit which sequentially transmits the first field image and shifts the second field image; and
    a viewing zone dividing unit which divides the viewing zones of the first field image and the second field image,
    wherein a moiré pattern is removed by the first field image and the shifted second field image, and the display device has a fill factor of 0.5 whereby a pixel of the first field image is formed on a half pixel of the display device and a pixel of the second field image is formed on another half pixel of the display device.

2. The apparatus according to claim 1, wherein the image shift unit includes a polarization converting switch which is positioned between the display device and the viewing zone dividing unit and selectively converts the polarization direction of incident light, and a birefringence element which directly transmits or refracts the light by changing a refractive index according to the polarization direction of the light passing through the polarization converting switch.

3. The apparatus according to claim 2, wherein the polarization converting switch is a liquid crystal polarization converter.

4. The apparatus according to claim 3, wherein the polarization converting switch is turned on and off in synchronization with the first and second field image signal.

5. The apparatus according to claim 2, wherein the birefringence element comprises calcite or liquid crystal.

6. The apparatus according to claim 2, wherein the birefringence element has a triangular shape and is adhered to a prism.

7. The apparatus according to claim 6 wherein the birefringence element and the prism are arranged in an array shape.

8. The apparatus according to claim 2, wherein the viewing zone dividing unit has a liquid crystal barrier so as to selectively switch between a two dimensional image and a three dimensional image.

9. The apparatus according to claim 1, wherein the viewing zone dividing unit comprises a lenticular lens, a fly's eye lens or a parallax barrier.

10. The apparatus according to claim 1, wherein the viewing zone dividing unit has a liquid crystal barrier so as to selectively switch between a two dimensional image and a three dimensional image.

11. The apparatus according to claim 1, wherein the display device is a liquid crystal display (LCD) device or a ferro liquid crystal display (FLCD) device.

12. The apparatus according to claim 1, wherein the image shift unit shifts the second field image by ½ of the pixel pitch.

* * * * *